United States Patent
Matsumoto et al.

(10) Patent No.: US 8,563,151 B2
(45) Date of Patent: Oct. 22, 2013

(54) ELECTRIC VEHICLE

(75) Inventors: Junichi Matsumoto, Toyota (JP); Teruo Ishishita, Miyoshi (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 380 days.

(21) Appl. No.: 12/991,831

(22) PCT Filed: Jun. 2, 2009

(86) PCT No.: PCT/JP2009/060072
§ 371 (c)(1),
(2), (4) Date: Nov. 9, 2010

(87) PCT Pub. No.: WO2009/150965
PCT Pub. Date: Dec. 17, 2009

(65) Prior Publication Data
US 2011/0059341 A1    Mar. 10, 2011

(30) Foreign Application Priority Data
Jun. 12, 2008  (JP) ................... 2008-154138

(51) Int. Cl.
*H01M 2/12* (2006.01)
*H01M 10/50* (2006.01)
*B60K 1/00* (2006.01)
*B60K 11/06* (2006.01)
*B60L 3/00* (2006.01)
*B60J 1/00* (2006.01)

(52) U.S. Cl.
USPC .............. 429/82; 429/61; 429/120; 180/65.1; 180/68.2; 180/271; 454/75

(58) Field of Classification Search
USPC .............. 429/157, 158, 82, 61, 120; 180/65.1, 180/68.2, 68.5; 340/825.72, 632; 454/75
See application file for complete search history.

(56) References Cited

U.S. PATENT DOCUMENTS 5,490,572 A * 2/1996 Tajiri et al. ............... 180/65.1
6,072,398 A * 6/2000 Hayes et al. ............... 340/632
(Continued)

FOREIGN PATENT DOCUMENTS

JP 11-339747 A 12/1999
JP 2000-016232 A 1/2000
(Continued)

OTHER PUBLICATIONS

Machine Translation of: JP 2001/291532 A, Isaji et al., Oct. 19, 2001.*

(Continued)

*Primary Examiner* — Kenneth Douyette
(74) *Attorney, Agent, or Firm* — Sughrue Mion, PLLC

(57) ABSTRACT

An electric vehicle is provided with a cell voltage sensor (32) and a cell temperature sensor (31) which are mounted to each of a plurality of cells (21); a gas temperature sensor (33), a carbon monoxide gas sensor (34), and a hydrogen gas sensor (35) which are mounted to a chamber (27); a gas temperature sensor (36), a carbon monoxide gas sensor (37), and a hydrogen gas sensor (38) which are mounted to a gas exhaust passage (28); and an air-conditioning fan (17), a channel-switching damper (19), and a driving motor (42) which lowers a window glass (41). When battery state values detected by the sensors (31) to (38) exceed predetermined thresholds, a battery pack (20) is judged to be abnormal. Then, the channel-switching damper (19) and the air-conditioning fan (17) are started and the window glass (41) is lowered to ventilate the vehicle interior. This speedily exhausts smoke generated from a lithium ion battery.

4 Claims, 5 Drawing Sheets

(56) References Cited

U.S. PATENT DOCUMENTS

| | | | |
|---|---|---|---|
| 6,208,256 B1* | 3/2001 | Fleming et al. | 340/632 |
| 6,479,187 B1* | 11/2002 | Takasaki et al. | 429/157 |
| 2005/0046584 A1* | 3/2005 | Breed | 340/825.72 |
| 2005/0138941 A1 | 6/2005 | Kikuchi | |
| 2007/0015451 A1* | 1/2007 | McGrath, Jr. | 454/75 |
| 2007/0289789 A1* | 12/2007 | Tsuchiya | 180/68.2 |
| 2009/0192681 A1 | 7/2009 | Hayashi et al. | |

FOREIGN PATENT DOCUMENTS

| | | | |
|---|---|---|---|
| JP | 2001-291532 A | | 10/2001 |
| JP | 2002/257728 A | * | 9/2002 |
| JP | 2002-260123 A | | 9/2002 |
| JP | 2003-297321 A | | 10/2003 |
| JP | 2004-331024 A | | 11/2004 |
| JP | 2007-099075 A | | 4/2007 |
| JP | 2008-041376 A | | 2/2008 |

OTHER PUBLICATIONS

Machine Translation of: JP 2002/257728A, Atsumi, Sep. 11, 2002.*
Russian Office Action for corresponding RU Patent Application No. 2011100167 issue on Feb. 22, 2012.
Translation of International Preliminary Report on Patentability for corresponding International Patent Application No. PCT/JP2009/060072.
Supplementary European Search Report dated Sep. 15, 2011 issued in a corresponding European Patent Application No. 09762395.3.

* cited by examiner

ELECTRIC VEHICLE

This is a National Stage Entry of International Application No. PCT/JP 2009/060072 filed Jun. 2, 2009, claiming priority based on Japanese Patent Application No. 2008-154138 filed Jun. 12, 2008, the contents of all of which are incorporated herein by reference in their entirety.

TECHNICAL FIELD

The present invention relates to the structure of an electrically powered vehicle provided with a lithium ion battery.

BACKGROUND ART

In recent years, electrically powered vehicles that travel by a driving force from a motor, such as hybrid vehicles, fuel cell vehicles, and electric vehicles, have received attention as one solution for environmental issues. Such an electrically powered vehicle is provided with a secondary cell such as a battery. As a secondary cell included in a power supply for driving a vehicle, nickel-hydrogen batteries, lead storage batteries, or the like are conventionally used.

A secondary cell used for driving a vehicle is often installed inside a vehicle interior, in order to cool the secondary cell by air-conditioned air in the vehicle interior. In particular, in order to efficiently use the capacity of an air conditioner for a vehicle interior, air in the vehicle interior is fed to the secondary cell to cool the secondary cell, and then the warmed air is returned inside the vehicle interior where the warmed air is cooled by the air conditioner for the vehicle interior. In this way, higher efficiency of the air conditioner can be achieved as compared with the case where air is exhausted out of the vehicle after cooling the secondary cell. Further, because no duct connecting the secondary cell to the outside is required, noise inside the vehicle interior can be reduced by avoiding noise which would intrude through the duct.

Further, use of a lithium ion battery as a secondary cell for driving a vehicle is becoming more common, because the lithium ion battery has higher energy density and downsizing capability than a nickel-hydrogen battery or a lead storage battery. However, the lithium ion batteries have a risk that smoke is generated due to a short circuit or the like in the lithium ion battery when a battery pack receives an impact due to a collision of the vehicle or the like. In such a case, if a secondary cell is installed inside the vehicle interior as described above, the generated smoke enters the vehicle interior and therefore, it becomes necessary to exhaust the smoke out of the vehicle interior.

Therefore, there is proposed a method for exhausting smoke out of a vehicle interior in which even if smoke is generated from an internal lithium ion battery upon a battery pack receiving an impact, the generated smoke can be exhausted out of the vehicle by establishing communication, in advance, between the vehicle interior and the outside of the vehicle when a collision or the like of a vehicle is predicted (for example, refer to JP 2007-99075 A (Patent Document 1)).

PRIOR ART DOCUMENT

Patent Document

Patent Document 1: JP 2007-99075 A

DISCLOSURE OF THE INVENTION

Objects to be Achieved by the Invention

In the conventional art disclosed in JP 2007-99075 A (Patent Document 1), an air conditioner is started and a window is opened when a collision of a vehicle is predicted by a collision detection sensor or laser provided with the vehicle. Accordingly, the air conditioner can be started and the window opened even when no actual collision occurs and no impact is received by a vehicle. Such an operation may oppose a user's intention and cause the user to feel that something is wrong. Further, smoke may be generated even when no impact is received by a battery pack, depending on a state of a lithium ion battery. In the conventional art disclosed in JP 2007-99075 A (Patent Document 1), when smoke is generated by a reason other than a collision, a passenger needs to exhaust the smoke, for example, by opening a window. Thus, there is a problem that the smoke cannot be exhausted promptly.

An object of the present invention is to promptly exhaust smoke out of a vehicle when smoke is generated from a lithium ion battery mounted inside the vehicle interior.

Means for Achieving the Objects

An electrically driven vehicle according to an embodiment of the present invention comprises a lithium ion battery mounted inside a vehicle interior; a battery state detector that detects the state of the lithium ion battery; a ventilation mechanism that ventilates air inside the vehicle interior; and a controller that starts and stops the ventilation mechanism, wherein the controller includes a ventilation mechanism starting means that starts the ventilation mechanism when the controller determines that the lithium ion battery is in an abnormal state in view of a value showing the state of the lithium ion battery detected by the battery state detector exceeding a predetermined threshold.

Preferably, an electrically driven vehicle according to an embodiment of the present invention may comprise a gas discharge passage through which gas emitted from the lithium ion battery under abnormal conditions of the lithium ion battery is exhausted out of the vehicle interior; the battery state detector is one of or a combination of a voltage sensor and a temperature sensor installed on the lithium ion battery, and a gas sensor and a gas temperature sensor installed in the gas discharge passage; the ventilation mechanism comprises an outside air introduction mechanism that introduces outside air into the vehicle interior, and a window glass drive mechanism that opens and closes a window glass in the vehicle interior; and the ventilation mechanism starting means comprises an outside air introduction starting means and a window opening starting means that starts opening of a window by the window glass drive mechanism.

Preferably, an electrically driven vehicle according to an embodiment of the present invention may comprise a chamber that covers an upper portion of the lithium ion battery and is connected to the gas discharge passage, the chamber collecting gas emitted from the lithium ion battery under abnormal conditions of the lithium ion battery, and one or both of the gas sensor and the gas temperature sensor are provided on a top internal surface of the chamber.

Effects of the Invention

The present invention provides an advantage that when smoke is generated from a lithium ion battery mounted inside a vehicle interior, the smoke can be promptly exhausted out of the vehicle.

BEST MODE FOR CARRYING OUT THE INVENTION

Figure 1:
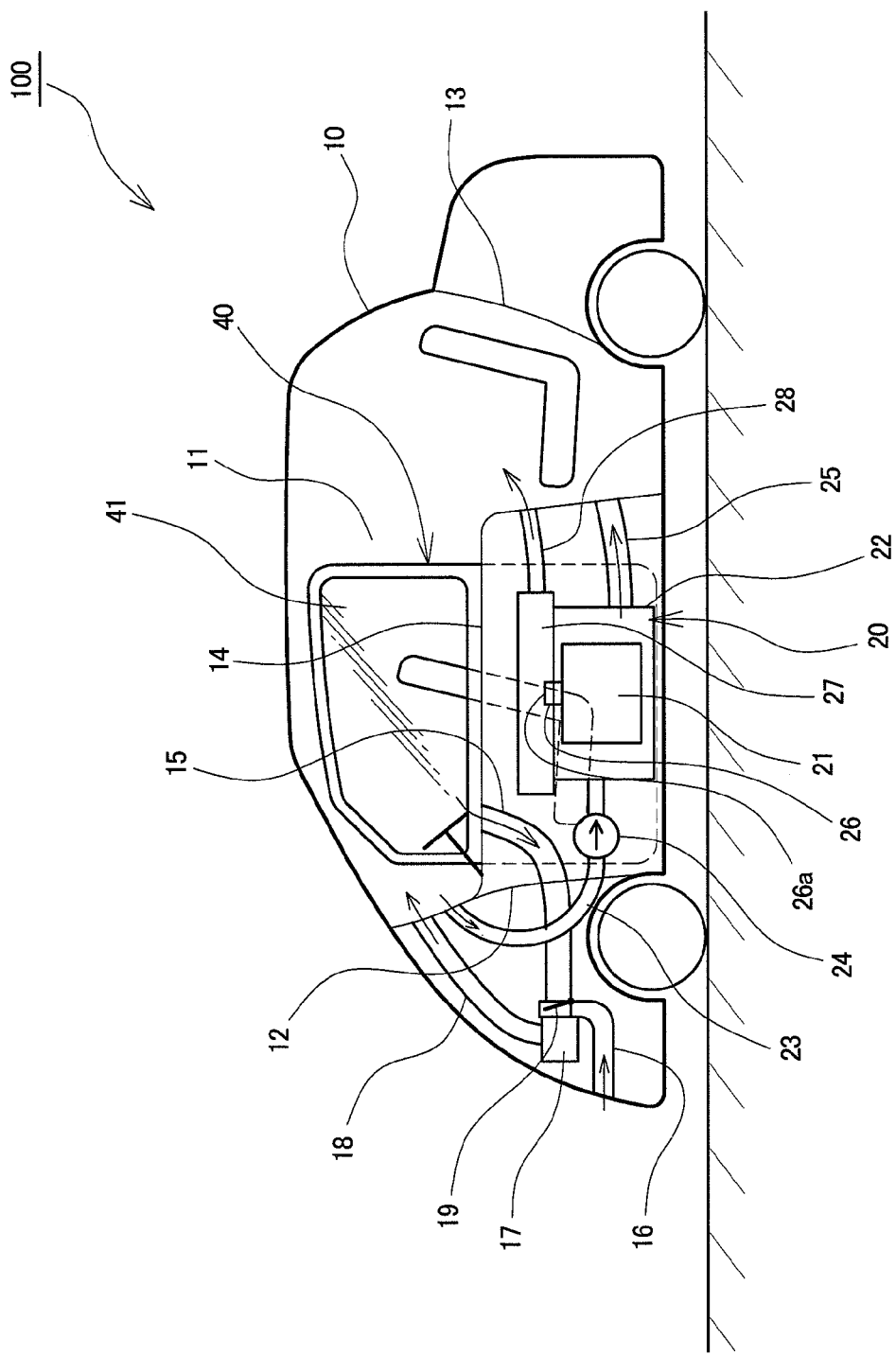
FIG. 1 shows an illustrative diagram showing the structure of an electrically powered vehicle according to an embodiment of the present invention.

Preferred embodiments of the present invention are described below with reference to the accompanying drawings. As shown in FIG. 1, an electrically driven vehicle 100 according to an embodiment of the present invention comprises a vehicle body 10, and a vehicle interior 11 which is located inside the vehicle body 10 and defined by a front partition 12 and a rear partition 13. Placed under a hood in front of the front partition 12 are an engine, a motor generator for driving the vehicle, a power distribution mechanism, an inverter, a drive gear, or the like (none of which is shown). A door 40 including a window glass 41 is pivotally attached to the vehicle body 10. The window glass 41 is opened downwards or closed upwards by a driving motor and gear (not shown). The driving motor and gear form a window glass drive mechanism.

An air-conditioning fan 17 for sending air into the vehicle interior 11 is provided under the hood in front of the front partition 12. The air-conditioning fan 17 is provided with a vehicle interior air intake duct 15 connected to the vehicle interior 11, an outside air intake duct 16 for introducing air from outside the vehicle, and a channel-switching damper 19 for switching a channel between the vehicle interior air intake duct 15 and the outside air intake duct 16. In addition, the air-conditioning fan 17 is provided with an air delivery duct 18 for sending into the vehicle interior 11 air sucked through the vehicle interior air intake duct 15 or the outside air intake duct 16. The air delivery duct 18 is designed to include a thermal exchanger of an air conditioner (not shown) to cool the drawn air before sending the air into the vehicle interior 11. When the channel-switching damper 19 is switched to the vehicle interior air intake duct 15 side, the vehicle interior 11 is substantially sealed and almost no outside air enters the vehicle interior 11. An outside air introduction mechanism is formed by the outside air intake duct 16, the channel-switching damper 19, the air-conditioning fan 17, and the air delivery duct 18. The window glass drive mechanism described above and the outside air introduction mechanism form a ventilation mechanism.

Inside the vehicle interior 11, a driver seat and passenger seats are provided. A cell installation space defined by an enclosure 14 is disposed between the driver's seat and a front passenger's seat. The cell installation space is designed to communicate with the vehicle interior 11. A battery pack 20 including a plurality of cells 21 of lithium ion battery type is installed inside the cell installation space. The battery pack 20 is provided with an air intake duct 23 for introducing air to be cooled from the vehicle interior 11 and an air discharge duct 25 for discharging into the vehicle interior 11 air which was warmed after cooling the battery pack 20. The air intake duct 23 is provided with a cooling fan 24. Further, an gas discharge nozzle 26 is provided on a top surface of each cell 21 of the lithium ion battery included in the battery pack 20 for discharging gas which is generated from each cell 21 in an abnormal state such as an occasion where the positive and negative electrodes are in contact with each other inside the cell 21. At an end surface of the gas discharge nozzle 26, a rupture disk 26a is provided. When an internal pressure inside the cell 21 is increased due to the generated gas, the rupture disk 26a is ruptured to discharge the gas from inside the cell 21 to the outside. A chamber 27 for collecting the gas discharged from the gas discharge nozzle 26 is provided on the top portion of the battery pack 20. The chamber 27 includes a gas discharge passage 28 through which the gas is discharged into the vehicle interior 11.

Figure 2:
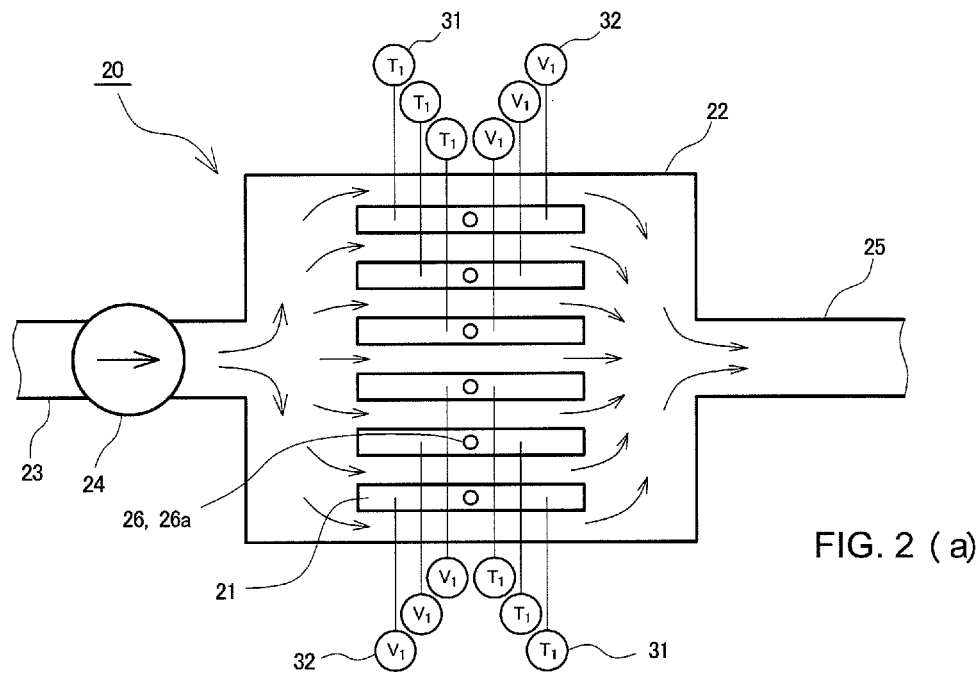
FIG. 2 shows illustrative diagrams of plan view and side view of a battery pack mounted to an electrically powered vehicle according to an embodiment of the present invention.
Figure 2:
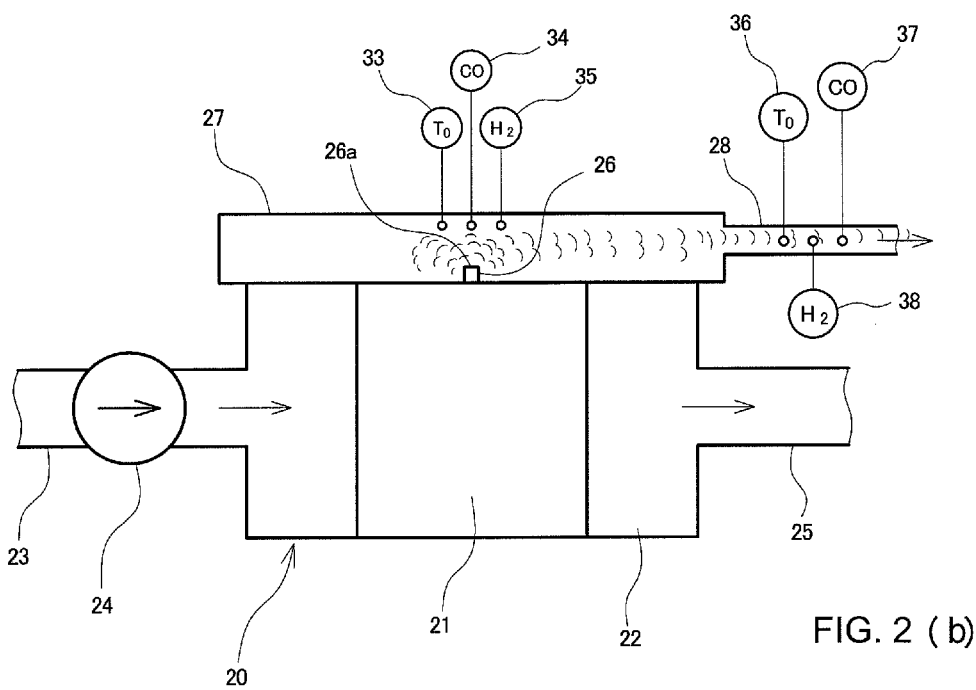

As shown in FIG. 2(a), the battery pack 20 includes plate cells 21 which are held upright and arranged along the width direction with space therebetween in a casing 22 of the battery pack 20. Stored electric power which is derived from the respective cells 21 is combined and provided as output from the battery pack 20. Cooling air is caused to flow in the space between cells 21 from the air intake duct 23 towards the air discharge duct 25 by means of the cooling fan 24. Thus, each cell 21 is kept cooled in a range of operational temperature. As shown in FIG. 2(a) and FIG. 2(b), the gas discharge nozzle 26 and the rupture disk 26a are provided at the center of the top portion of each cell 21. Each cell 21 is provided with a cell voltage sensor 32 for measuring an output voltage of each cell 21 and a cell temperature sensor 31 for measuring a temperature of each cell 21.

As shown in FIG. 2(b), a plurality of gas temperature sensors 33, carbon monoxide gas sensors 34, and hydrogen gas sensors 35 are installed on the top portion inside the chamber 27 which is provided in the top portion of the battery pack 20. Each one of these sensors 33, 34, 35 is designed to be installed near the position directly above the gas discharge nozzle 26 provided with each cell 21 such that gas discharged from each cell 21 directly reaches each sensor 33, 34, 35 to enable highly sensitive detection of temperature, carbon monoxide gas, and hydrogen gas. It is also possible to install each of the gas temperature sensors 33, carbon monoxide gas sensors 34, and hydrogen gas sensors 35 near the center on the top internal surface of the chamber 27. Further, as shown in FIG. 2(b), a gas temperature sensor 36, a carbon monoxide gas sensor 37, and a hydrogen gas sensor 38 are installed in the gas discharge passage 28 through which the gas is discharged into the vehicle interior 11.

A battery state detector for detecting the state of the battery pack 20 which is a lithium ion battery is formed by the cell voltage sensor 32 for measuring an output voltage of each cell 21 and the cell temperature sensor 31 for measuring a temperature of each cell 21, both of the sensors being mounted to each cell 21; the gas temperature sensor 33, the carbon monoxide gas sensor 34, and the hydrogen gas sensor 35, each of these sensors being mounted in the chamber 27; and the temperature sensor 36, the carbon monoxide gas sensor 37, and the hydrogen gas sensor 38, each of these sensors being mounted in the gas discharge passage 28.

Figure 3:
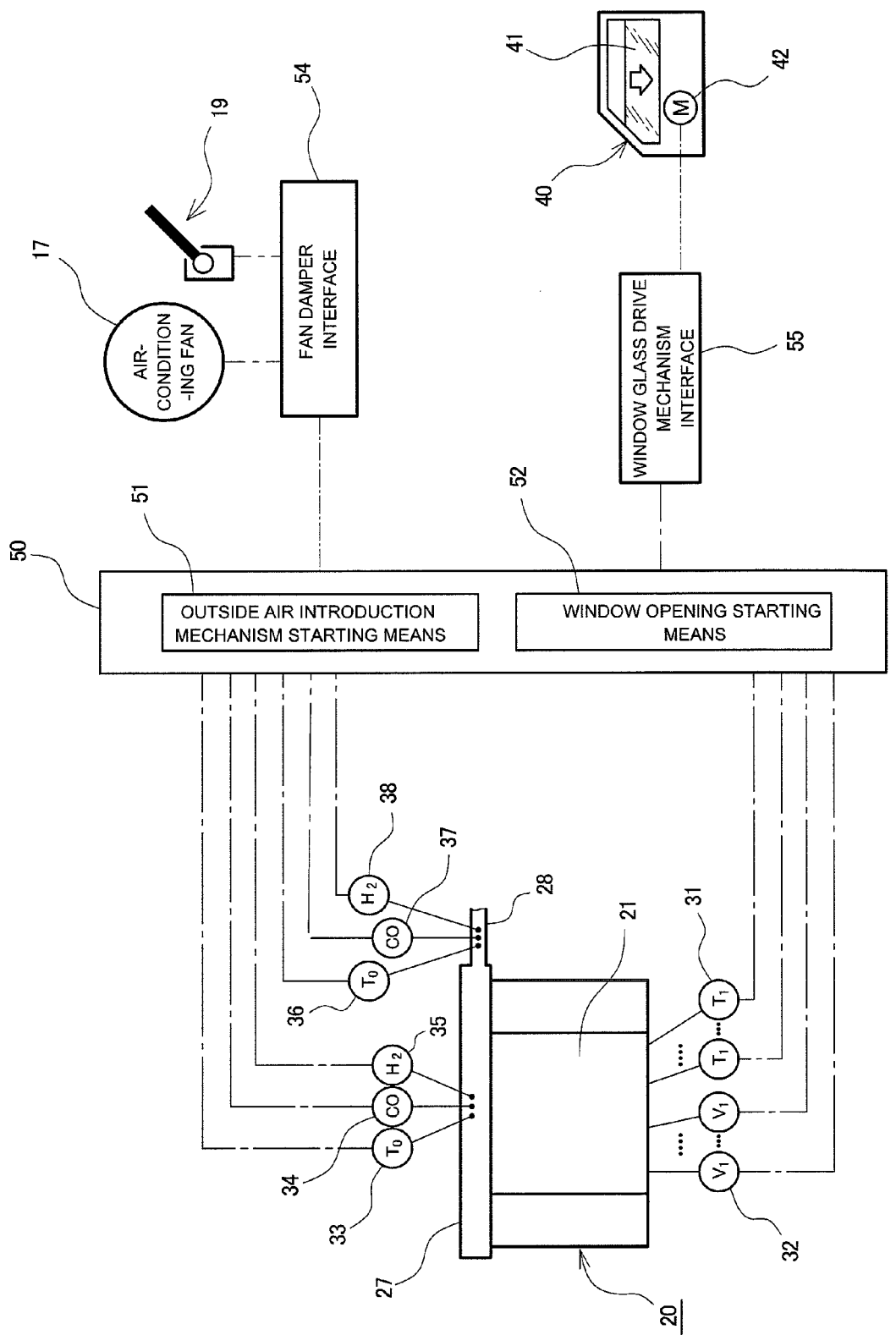
FIG. 3 shows a schematic diagram indicating a control system of an electrically powered vehicle according to an embodiment of the present invention.

As shown in FIG. 3, each sensor 31 to 38 installed in the battery pack 20 is connected to a controller 50 mounted to the electrically driven vehicle 100. In this embodiment, the controller 50 is a computer internally including a CPU and a memory. The dash-dot lines in FIG. 3 show signal lines. As shown in FIG. 3, the controller 50 includes an outside air introduction mechanism starting means 51 and a window opening starting means 52. The air-conditioning fan 17 and the channel-switching damper 19 of the electrically driven vehicle 100 are connected to the controller 50 via a fan damper interface 54 such that the air-conditioning fan 17 and the channel-switching damper 19 are driven by an command from the controller 50. Further, a driving motor 42 for opening and closing the window glass 41 of the door 40 of the electrically driven vehicle 100 is connected to the controller 50 via a window glass drive mechanism interface 55 such that the driving motor 42 is driven by an command from the controller 50.

Operations of the electrically driven vehicle 100 having the above structure are described below with reference to FIGS. 4 and 5. As shown in step S101 in FIG. 4, the controller 50 obtains a temperature and voltage of each cell 21 of the battery pack 20 by the cell temperature sensor 31 and cell voltage sensor 32. The controller 50 also obtains a gas temperature, carbon monoxide concentration, and hydrogen concentration inside the chamber 27 by the corresponding sensors 33 to 35 provided in the chamber 27. Further, the controller 50 obtains a gas temperature, carbon monoxide concentration, and hydrogen concentration in the gas discharge passage 28 by means of the corresponding sensors 36 to 38 provided in the gas discharge passage 28. Then, as shown in step S102 in FIG. 4, the controller 50 determines whether or not an abnormality has occurred in the battery pack 20.

At time 0 in FIG. 5, the cell voltage of each cell 21 shows a normal output and both the cell temperature and carbon monoxide concentration in the gas discharge passage are below threshold values. In such conditions, the controller 50 determines that the battery pack 20 is in a normal state and smoking has not occurred. The controller 50 returns to step S101 in FIG. 4 and monitors the state of the battery pack 20 by each sensor 31 to 38.

Figure 5:
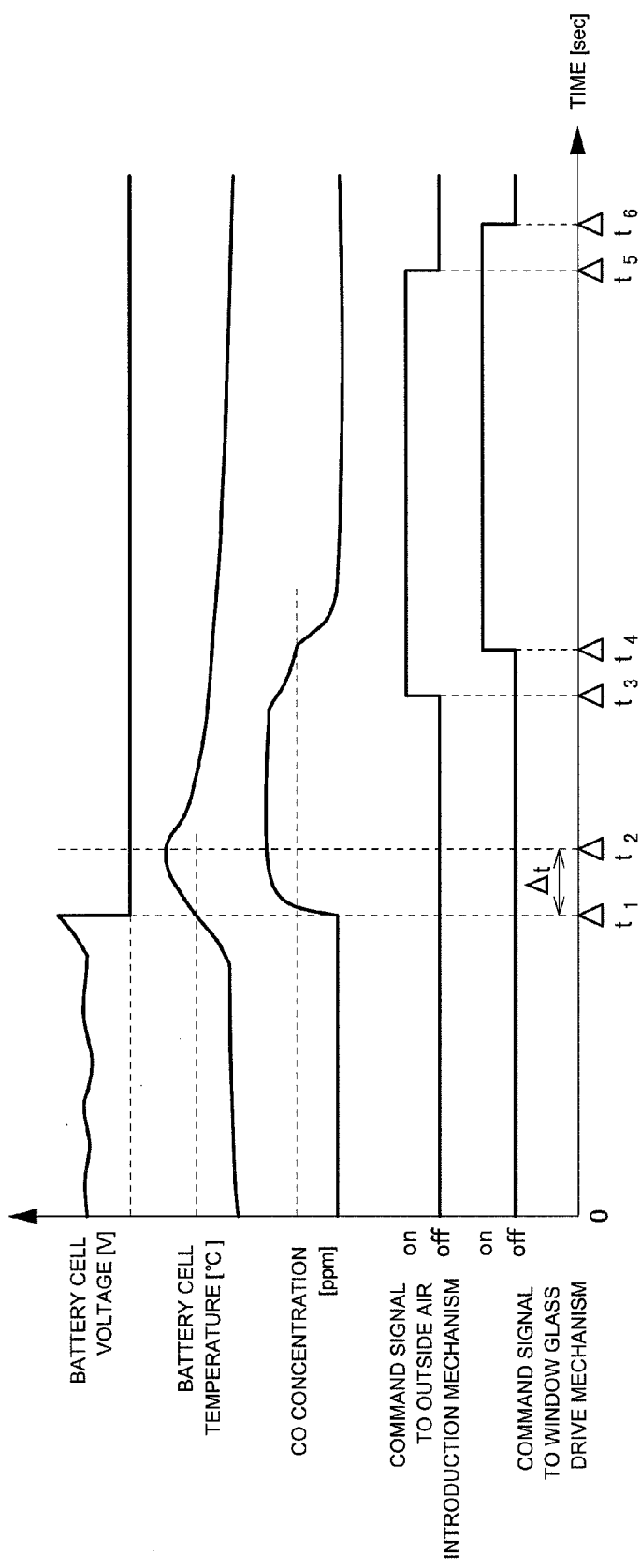
FIG. 5 shows a graph indicating changes of a cell voltage, cell temperature, and carbon monoxide concentration along with changes of command signals to an outside air introduction mechanism and a window glass drive mechanism when an abnormal state arises in a cell of an electrically powered vehicle according to an embodiment of the present invention.

On the other hand, as shown at time $t_1$ in FIG. 5, the controller 50 determines that an abnormality has occurred in the battery pack 20 when a cell voltage of one or more of the cells 21 falls down to substantially zero and the cell temperature and the carbon monoxide concentration in the gas discharge passage 28 exceed the respective threshold values. This is because it can be determined that the output voltage became zero because the positive and negative electrodes contacted each other in the cell 21; that gas was generated inside the cells due to the temperature rise of the battery inside the cells 21; and that the rupture disk 26a was ruptured by the gas pressure to allow the gas including carbon monoxide to flow from the cells 21 to the gas discharge passage 28 through the chamber 27, and then the gas turned into smoke and entered the vehicle interior 11.

Such an occurrence of abnormality can be determined by various sensors. In the above embodiment, occurrence of abnormality is determined when all of the cell voltage, cell temperature, and carbon monoxide concentration exceed corresponding threshold values. However, it is also possible to determine that an abnormality has occurred in the battery pack 20, for example, when the cell voltage is about zero and the carbon monoxide concentration exceeds a predetermined value. Alternatively, an abnormality can be determined to have occurred in the battery pack 20 when the temperature and the carbon monoxide concentration exceed corresponding threshold values. Further, an abnormality may be determined to have occurred in the battery pack 20 when, instead of the concentration of carbon monoxide, the concentration of hydrogen, which is another characteristic component included in the gas, exceeds a threshold value.

Figure 4:
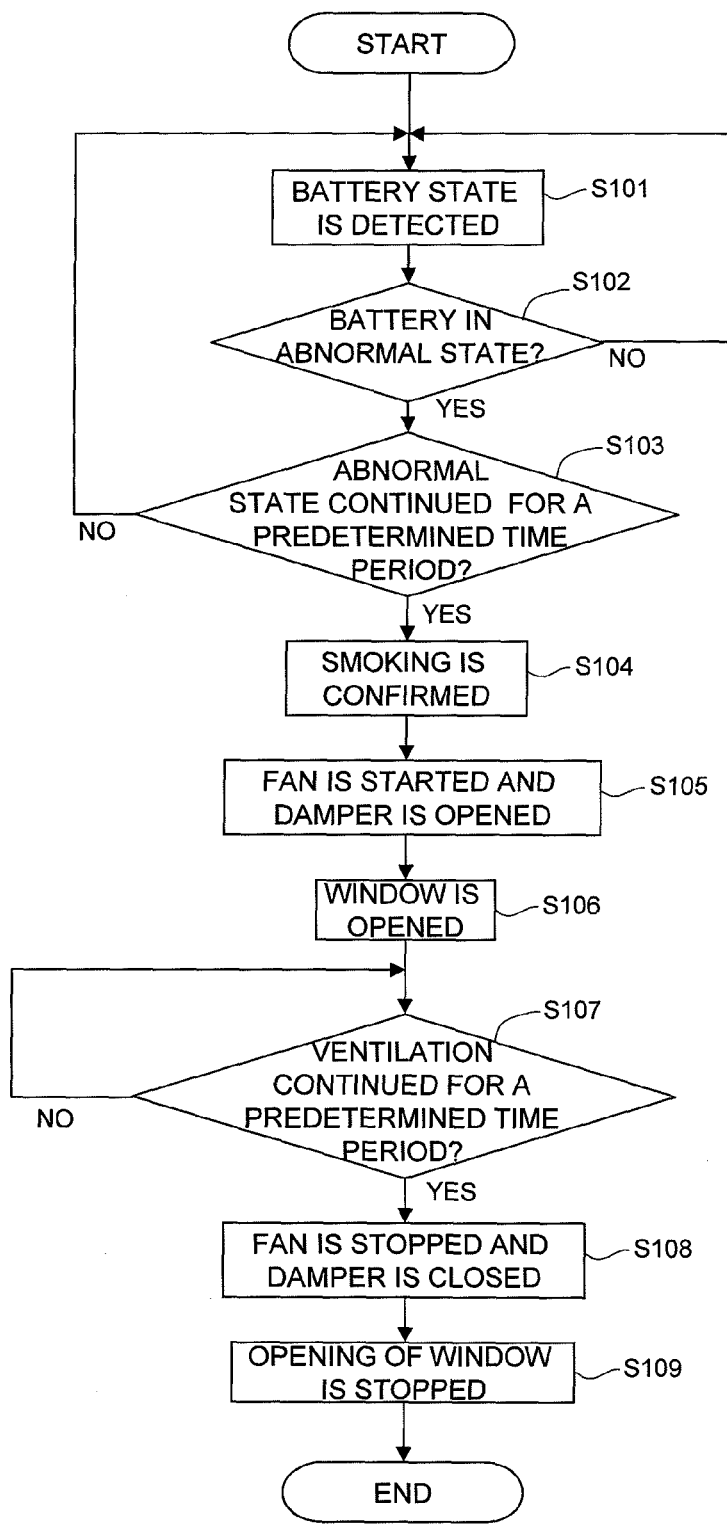
FIG. 4 shows a flowchart indicating operations of an electrically powered vehicle according to an embodiment of the present invention.

As shown in step S103 in FIG. 4, when the controller 50 determines that an abnormality has occurred in the battery pack 20, the controller 50 further determines whether or not the abnormal state has continued for a predetermined time period. For example, the controller 50 checks the state of the battery by each sensor 31 to 38 at predetermined intervals and increments a counter by one each time an abnormal state is determined based on the result. When the counter reaches a predetermined value, the abnormal state can be determined to have continued for a predetermined time period. Alternatively, the abnormal state can be determined to have continued for a predetermined time period if, after starting a timer inside the controller 50 at a timing when the battery pack 20 is determined to be in an abnormal state, the battery pack 20 is still in an abnormal state when the state of the battery is checked by each sensor 31 to 38 after a predetermined time period.

When the controller 50 determines that the abnormal state of the battery pack 20 has continued for a predetermined time period as shown as time $\Delta t$ in FIG. 5, the controller 50 determines that smoke is confirmed to be emitted from the battery pack 20 as shown in step S104 in FIG. 4 at time $t_2$ in FIG. 5.

When smoke is confirmed to be emitted from the battery pack 20, the controller 50 outputs an outside air introduction command to the fan damper interface 54 by the outside air introduction mechanism starting means 51 as shown in step S105 in FIG. 4 at time $t_3$ in FIG. 5. Upon receiving this command, the fan damper interface 54 switches the channel-switching damper 19 to the outside air intake duct 16 side and actuates the air-conditioning fan 17 to introduce outside air into the vehicle interior through the air delivery duct 18. In this operation, the amount of outside air to be introduced may be increased by setting the rotational speed of the air-conditioning fan 17 at a high rotation mode. The controller 50 also outputs a command to open a window to the window glass drive mechanism interface 55 by the window opening starting means 52 as shown in step S106 in FIG. 4 at time $t_4$ in FIG. 5. Upon receiving this command, the window glass drive mechanism interface 55 actuates the driving motor 42 to move the window glass 41 downwards to open the window. The window glass 41 may be moved downwards all the way until the window is fully opened, or stopped in the middle of the way where the window is half opened.

When outside air is introduced into the vehicle interior 11 through the air delivery duct 18 and the window is opened with the window glass 41 being moved downwards, the vehicle interior 11 is ventilated with outside air and the smoke entering the vehicle interior through the gas discharge passage 28 is exhausted out of the vehicle interior 11 from the opened window. As shown in FIG. 5, when a certain time period has elapsed after smoking was confirmed, the discharge of the gas from the cell 21 is stopped. Therefore, the carbon monoxide concentration in the gas discharge passage 28 is rapidly lowered to return to the initial state. Further, the temperature of the cell 21 is lowered over time to return to about the initial temperature after a certain period of time.

As shown in step S107 in FIG. 4, the controller 50 determines whether or not a predetermined time has elapsed after outside air was introduced and the window was opened. This determination may be performed by counting time by a timer inside the controller 50 or summing up time by an integration counter inside the controller 50.

When the controller 50 determines that the predetermined time has elapsed after outside air was introduced and the window was opened, the controller 50 outputs an outside air introduction stop command to the fan damper interface 54 as shown in steps S108 and 5109 in FIG. 4 at time $t_5$ in FIG. 5. In response to this command, the fan damper interface 54 stops the air-conditioning fan 17 and switches the channel-switching damper 19 to the vehicle interior air intake duct 15 side. The controller 50 also outputs a window opening stop command to the window glass drive mechanism interface 55. In response to this command, the window glass drive mechanism interface 55 stops the driving motor 42 to stop opening of the window at time $t_6$ in FIG. 5. If the window is fully opened at this point, the window glass 41 is not moved further and the fully opened state is maintained.

As described above, according to an embodiment of the present invention, there can be achieved an advantage that when smoke is generated from the battery pack 20, the smoke can be promptly exhausted out of the vehicle and therefore, visibility deterioration due to the smoke can be reduced because detection of abnormality and smoking from the battery pack 20 is performed by sensors 31 to 38 provided with each cell 21, the chamber 27, or the gas discharge passage 28 of the battery pack 20 of lithium ion battery type. Another advantage achieved by the present invention is that it is possible to avoid the situation to cause the user to feel that something is wrong because the actuation of the air-conditioning fan 17 and opening of the window are suppressed when no smoke is generated from the battery pack 20.

According to an embodiment of the present invention, a further advantage can be achieved that smoke can be promptly exhausted out of the vehicle when smoking is caused not only by an impact received by the battery pack 20 due to a collision or the like of the electrically driven vehicle 100 but also by an abnormality of the cell 21 of the battery pack 20 such as an internal short circuit, overcharging, or overheating.

REFERENCE NUMERALS 10 vehicle body, 11 vehicle interior, 14 enclosure, 15 vehicle interior air intake duct, 16 outside air intake duct, 17 air-conditioning fan, 18 air delivery duct, 19 channel-switching damper, 20 battery pack, 21 cell, 22 casing, 23 air intake duct, 24 cooling fan, 25 air discharge duct, 26a rupture disk, 26 gas discharge nozzle, 27 chamber, 28 gas discharge passage, 31 cell temperature sensor, 32 cell voltage sensor, 33, 36 gas temperature sensor, 34, 37 carbon monoxide gas sensor, 35, 38 hydrogen gas sensor, 40 door, 41 window glass, 42 driving motor, 50 controller, 51 outside air introduction mechanism starting means, 52 window opening starting means, 54 fan damper interface, 55 window glass drive mechanism interface, 100 electrically driven vehicle, $t_1$ to $t_6$ time, $\Delta t$ time.

The invention claimed is:

1. An electrically driven vehicle, comprising:
a battery mounted inside a vehicle interior;
an air intake duct which is provided with a cooling fan, and which is adapted to provide the battery with cooling air from the vehicle interior;
an air discharge duct arranged to discharge, into the vehicle interior, air which was warmed after cooling the battery;
a battery state detector that detects a state of the battery;
a ventilation mechanism which comprises an outside air introduction mechanism that introduces outside air into the vehicle interior, and which ventilates air inside the vehicle interior; and
a controller that starts and stops the ventilation mechanism, characterized in that:
the battery is a lithium ion battery;
the electrically driven vehicle comprises a gas discharge passage through which gas emitted from the lithium ion battery under abnormal conditions of the lithium ion battery is discharged into the vehicle interior;
the ventilation mechanism comprises a window glass drive mechanism that moves a window glass in the vehicle interior;
the controller includes a ventilation mechanism starting means that starts the ventilation mechanism when the lithium ion battery is determined to be in an abnormal state when a value showing the state of the lithium ion battery detected by the battery state detector exceeds a predetermined threshold, said ventilation mechanism starting means comprising an outside air introduction starting means and a window opening starting means that starts opening of the window glass by the window glass drive mechanism; and
the battery state detector is any one of or a combination of any one of:
a voltage sensor installed in the lithium ion battery,
a temperature sensor installed in the lithium ion battery,
a gas sensor installed in the gas discharge passage, and
a gas temperature sensor installed in the gas discharge passage.

2. The electrically driven vehicle according to claim 1, wherein
the vehicle comprises a chamber that covers an upper portion of the lithium ion battery,
has the gas discharge passage connected thereto, and collects gas emitted from the lithium ion battery under abnormal conditions of the lithium ion battery, and
one or both of the gas sensor and the gas temperature sensor are provided on a top internal surface of the chamber.

3. The electrically driven vehicle according to claim 1, wherein the gas sensor is one or both of a carbon monoxide gas sensor and a hydrogen gas sensor.

4. The electrically driven vehicle according to claim 2, wherein the gas sensor is one or both of a carbon monoxide gas sensor and a hydrogen gas sensor.

* * * * *